United States Patent
Hashimoto et al.

(10) Patent No.: US 10,148,157 B2
(45) Date of Patent: Dec. 4, 2018

(54) METHOD OF MANUFACTURING STATOR FOR ROTARY ELECTRIC MACHINE

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Shingo Hashimoto, Okazaki (JP); Hiroyuki Tanaka, Anjo (JP); Takanori Ota, Anjo (JP); Osamu Nakagawa, Anjo (JP); Shingo Sato, Okazaki (JP); Hirotaka Kawaura, Toyota (JP); Norihiko Akao, Nissin (JP); Tetsuya Sugimoto, Chiryu (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 178 days.

(21) Appl. No.: 14/764,868

(22) PCT Filed: Mar. 26, 2014

(86) PCT No.: PCT/JP2014/058413
§ 371 (c)(1),
(2) Date: Jul. 30, 2015

(87) PCT Pub. No.: WO2014/157273
PCT Pub. Date: Oct. 2, 2014

(65) Prior Publication Data
US 2016/0028295 A1   Jan. 28, 2016

(30) Foreign Application Priority Data
Mar. 29, 2013   (JP) ................. 2013-073204

(51) Int. Cl.
H02K 15/00   (2006.01)
H02K 15/06   (2006.01)
H02K 3/18   (2006.01)

(52) U.S. Cl.
CPC ............. *H02K 15/066* (2013.01); *H02K 3/18* (2013.01); *H02K 15/0075* (2013.01); *Y10T 29/49009* (2015.01)

(58) Field of Classification Search
CPC ......... Y10T 29/49009; Y10T 29/49071; Y10T 29/49012; Y10T 29/49073;
(Continued)

(56) References Cited

U.S. PATENT DOCUMENTS

| 8,230,580 | B2 * | 7/2012 | Kiyono | H02K 15/12 29/596 |
| 2010/0066198 | A1 | 3/2010 | Fubuki et al. | |
| 2010/0187918 | A1 * | 7/2010 | Takahashi | H02K 1/148 310/43 |

FOREIGN PATENT DOCUMENTS

| JP | 2008-220093 A | 9/2008 |
| JP | 2010-110122 A | 5/2010 |

(Continued)

*Primary Examiner* — Thiem Phan
(74) *Attorney, Agent, or Firm* — Oliff PLC

(57) ABSTRACT

A method of manufacturing a stator for a rotary electric machine by disposing coils in a plurality of phases on a plurality of teeth of a stator core, one coil on one tooth, wherein in sequentially disposing the coils in the plurality of phases on the teeth, one coil on one tooth, toward one side in the circumferential direction of the stator core, the one end portion of each of the coils in each phase is inserted from the one side in the axial direction of the stator core, or from a direction that is orthogonal to the axial direction of the stator core, to be disposed between the one end portion and the other end portion of the immediately preceding coil in a (Continued)

separate phase disposed on the tooth so as to be aligned with the other end portion of the coil in the same phase.

8 Claims, 10 Drawing Sheets

(58) Field of Classification Search
CPC ........ Y10T 29/53143; Y10T 29/49069; H02K 3/28; H02K 1/16; H02K 15/0056
USPC ..... 29/596, 598, 603.01, 604, 605, 606, 729
See application file for complete search history.

(56) References Cited

FOREIGN PATENT DOCUMENTS

| | | |
|---|---|---|
| JP | 2010-141962 A | 6/2010 |
| JP | 2012-223056 A | 11/2012 |
| JP | 2012-257410 A | 12/2012 |

\* cited by examiner

METHOD OF MANUFACTURING STATOR FOR ROTARY ELECTRIC MACHINE

BACKGROUND

The present disclosure relates to a method of manufacturing a stator for a rotary electric machine by disposing coils in a plurality of phases on a plurality of teeth of a stator core.

Methods of manufacturing a stator for a rotary electric machine include a method in which coils are disposed on an integrally shaped stator core, a method in which coils are disposed on divided cores which are divided pieces of a stator core and in which the divided cores with the coils are coupled to each other, and so forth. In addition, the coils may be formed by collectively winding a plurality of thin magnet wires, and may be formed by winding a single rectangular conductor.

For example, JP 2012-257410 A describes an apparatus for manufacturing a motor stator that fits a plurality of trapezoidal coils formed by bending a flat rectangular conductor with a rectangular cross section onto a plurality of teeth of a stator core. The manufacturing apparatus has a coil shape restriction member that restricts the trapezoidal coils to an obliquely deformed state. The trapezoidal coils are fitted onto the teeth with the coil shape restriction member preventing the coils from being wound and twisted.

SUMMARY

In the case where a crossover line that extends from an end portion of a coil body to an end portion of another coil body are formed on the coil body in advance, it is difficult to dispose a coil having the coil body and the crossover line on the stator core. In this case, the crossover line may interfere with another coil when the coil is disposed on the stator core unless a contrivance is made on how to dispose the coils.

For the manufacturing apparatus according to JP 2012-257410 A, it is only indicated that a trapezoidal coil with no crossover line is disposed on the stator core.

The present disclosure according to an exemplary aspect has been made in view of such background, and has been obtained through an attempt to provide a method of manufacturing a stator for a rotary electric machine that facilitates disposing a coil on a stator core and that is capable of reducing the axial length of the entire stator.

An exemplary aspect of the present disclosure provides a method of manufacturing a stator for a rotary electric machine by disposing coils in a plurality of phases on a plurality of teeth of a stator core, one coil on one tooth, in which: each of the coils in each phase includes a coil body formed by winding a rectangular conductor a plurality of times, one end portion drawn out to one side in an axial direction of the stator core at one end of the coil body, and the other end portion drawn out to the one side in the axial direction of the stator core at the other end of the coil body; the one end portion of each of the coils in each phase is drawn out in a direction that is orthogonal to the axial direction of the stator core to extend over an outer side, in the axial direction of the stator core, of the coil body of the coil in a separate phase so as to be aligned with the other end portion of the coil in the same phase; and in sequentially disposing the coils in the plurality of phases on the teeth, one coil on one tooth, toward one side in the circumferential direction of the stator core, the one end portion of each of the coils in each phase is inserted from the one side in the axial direction of the stator core, or from a direction that is orthogonal to the axial direction of the stator core, to be disposed between the one end portion and the other end portion of the immediately preceding coil in a separate phase disposed on the tooth so as to be aligned with the other end portion of the coil in the same phase.

In the method of manufacturing a stator for a rotary electric machine described above, a contrivance is made to easily dispose a coil having one end portion drawn out in a direction that is orthogonal to the axial direction of a stator core on the stator core.

In the manufacturing method, the coils in the plurality of phases are sequentially disposed on the teeth, one coil on one tooth, toward one side in the circumferential direction of the stator core. In this event, at least one of the coils excluding the coils that are the first and the last to be disposed is disposed on the tooth as follows. That is, at least one of the coils described above is disposed on the tooth with the one end portion inserted from one side in the axial direction of the stator core, or from a direction (radial direction and circumferential direction) that is orthogonal to the axial direction of the stator core, to be disposed between the one end portion and the other end portion of the immediately preceding coil in a separate phase disposed on the tooth. In this event, the one end portion of each of the coils in each phase and the one end portion of the immediately preceding coil in a separate phase disposed on the tooth are positioned so as to overlap each other as viewed in the radial direction of the stator core.

This makes it easy to prevent the one end portion of each of the coils in each phase, when disposing the coil on the tooth, from interfering with the coil in a separate phase already disposed on the tooth. In addition, disposing the coil as described above eliminates the need to shift the position at which the one end portion and the other end portion are formed in the axial direction among the coils in the plurality of phases. Therefore, it is possible to reduce the amount by which the one end portion and the other end portion of each of the coils in each phase project from the axial end surface of the stator core.

In addition, the bent shape of the one end portion of each of the coils in each phase can be formed in advance before the coil is disposed on the stator core. This eliminates the need to process, e.g. bend, the coil disposed on the stator core. Therefore, it is possible to reduce the amount by which the one end portion and the other end portion of each of the coils in each phase project from the axial end surface of the stator core also for this reason.

The one end portion of each of the coils in each phase disposed on the tooth is aligned with the other end portion of the coil in the same phase. Then, the one end portion and the other end portion of the coils in the same phase are joined to each other by welding or the like. The joint may be performed every time each of the coils in each phase is disposed on the tooth, or may be performed after all the coils are disposed on the teeth. Alternatively, the joint may be performed at an appropriate timing after the coils are disposed on the teeth. The meaning of disposing a coil on a tooth is the same as the meaning of disposing a coil in slots between teeth.

Therefore, with the method of manufacturing a stator for a rotary electric machine described above, it is possible to easily dispose the coil on the stator core, and to reduce the length of the entire stator in the axial direction.

DETAILED DESCRIPTION OF THE EMBODIMENTS

Figure 1:
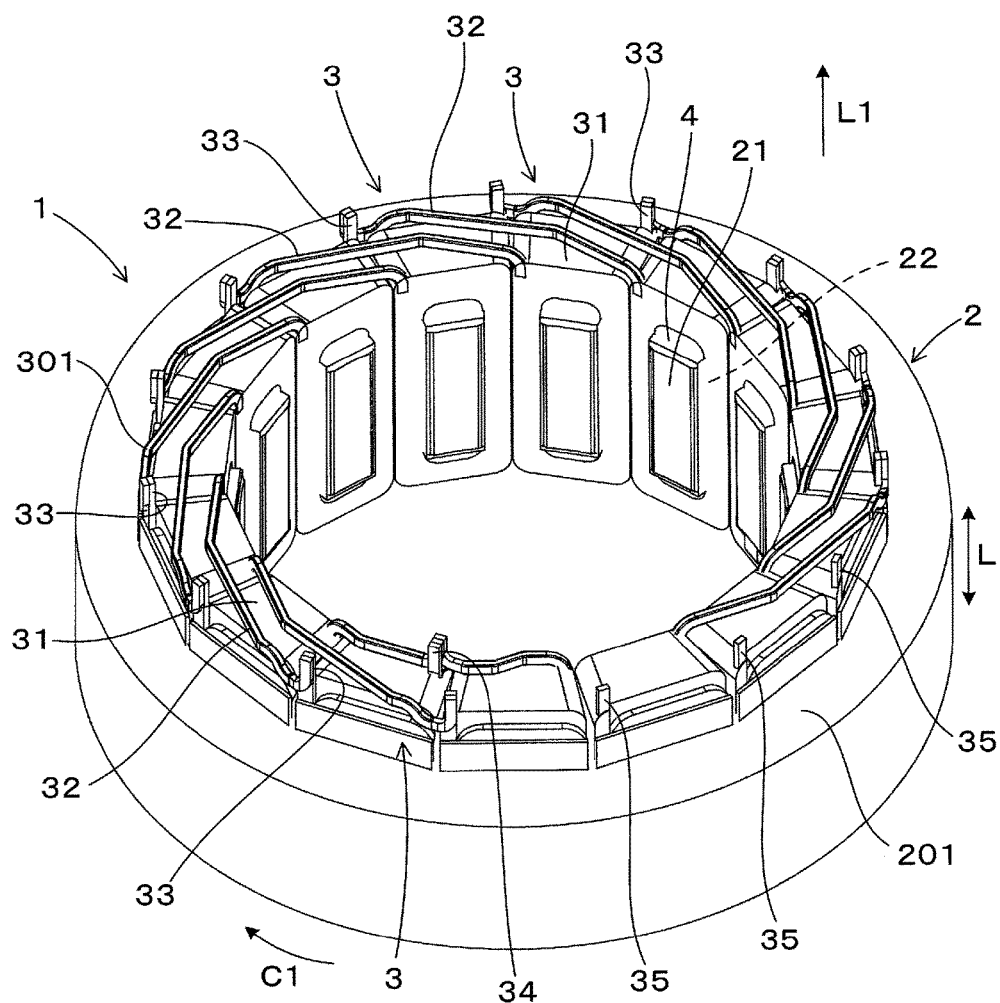
FIG. 1 is a perspective view illustrating a stator according to an embodiment.

A preferable embodiment of the method of manufacturing a stator for a rotary electric machine discussed above will be described.

In the method of manufacturing a stator for a rotary electric machine described above, the one end portion of each of the coils in each phase may be a lead portion that extends from one of a winding start portion and a winding end portion of the coil. Meanwhile, the other end portion of each of the coils in each phase may be a bus bar portion that extends from the other of the winding start portion and the winding end portion of the coil.

A section of the one end portion of each of the coils in each phase disposed between the one end portion and the other end portion of the immediately preceding coil in a separate phase disposed on the tooth may be the distal end portion of the one end portion, and may also be any section from the distal end portion to the base end portion of the one end portion.

In addition, the method of manufacturing a stator for a rotary electric machine described above may be applied to all the coils excluding the coil that is the last to be disposed on the stator core. In addition, the manufacturing method may also be applied to only some of the coils excluding the coil that is the last to be disposed on the stator core.

Each of the coils in each phase disposed between the one end portion and the other end portion of the immediately preceding coil in a separate phase disposed on the tooth may be disposed on the tooth first from a portion of the rectangular conductor of the coil body positioned on the side from which the one end portion is drawn out.

In this case, interference of each of the coils in each phase with the tooth can be easily avoided when each of the coils in each phase is disposed on the tooth. In addition, the proportion of the volume occupied by the rectangular conductor in slots between the teeth can be increased.

In addition, the one end portion of each of the coils in each phase disposed between the one end portion and the other end portion of the immediately preceding coil in a separate phase disposed on the tooth may be aligned with the other end portion of the coil in the same phase from the radially outer side with respect to the other end portion.

In this case, each of the coils in each phase can be easily disposed on the tooth of the stator core with the amount by which the one end portion of each of the coils in each phase is drawn outward with respect to the axial end surface of the stator core made as small as possible.

In addition, the coils in a plurality of phases may be coils formed in three phases, and when each of the coils in each phase is disposed on the tooth, the one end portion of each of the coils in each phase may be aligned with the other end portion of the coil in the same phase by disposing the one end portion between the one end portion and the other end portion of the immediately preceding coil in a separate phase disposed on the tooth and between the one end portion and the other end portion of the coil disposed on the tooth two steps before in a separate phase.

In this case, the coils formed in three phases can be disposed on the stator core to easily manufacture a stator for a 3-phase rotary electric machine.

EMBODIMENT

A method of manufacturing a stator for a rotary electric machine according to an embodiment will be described below with reference to the drawings.

Figure 2:
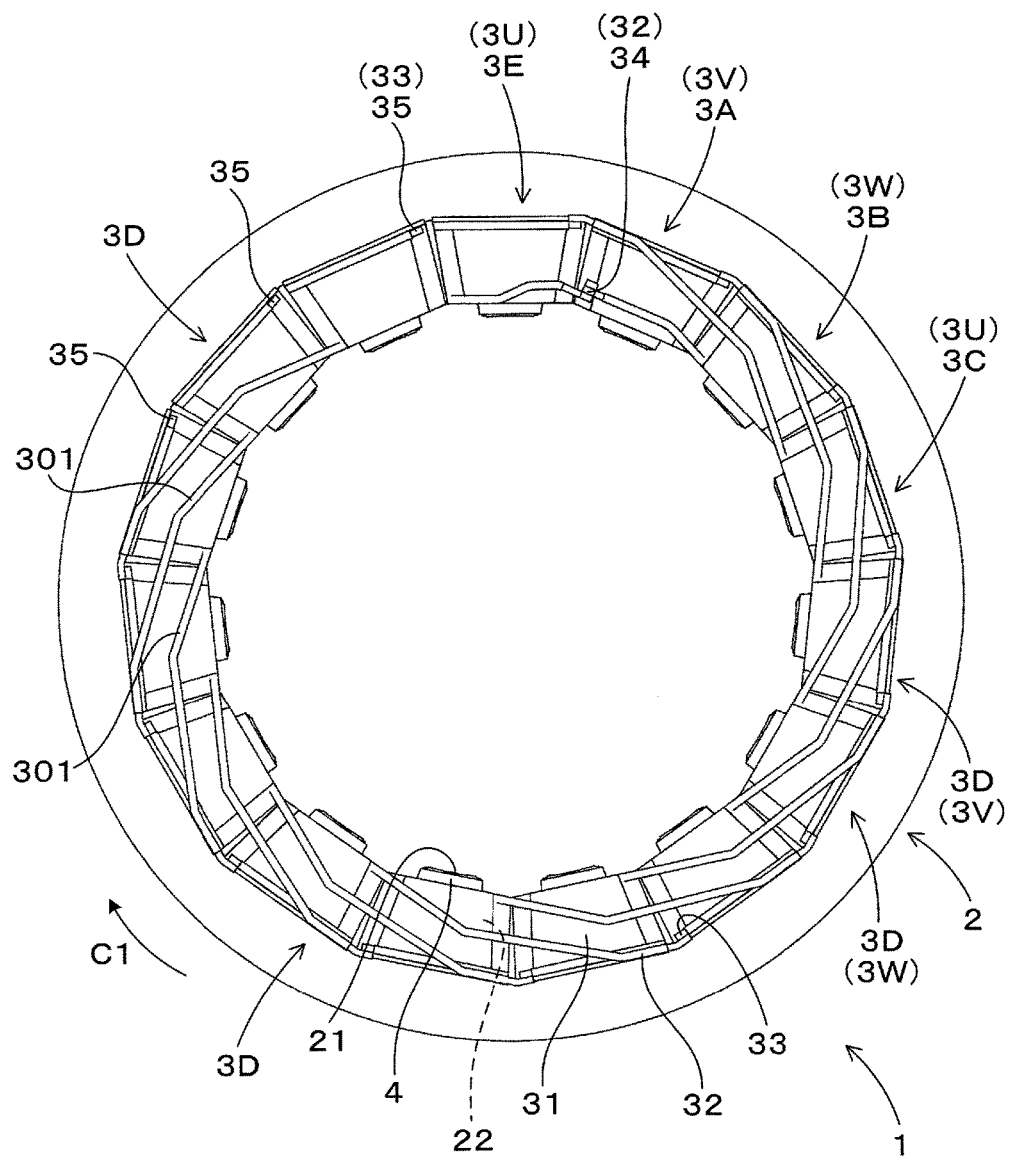
FIG. 2 is a plan view illustrating the stator according to the embodiment.

In the method of manufacturing a stator 1 for a rotary electric machine according to the embodiment, as illustrated in FIGS. 1 and 2, coils 3 in a plurality of phases are disposed on a plurality of teeth 21 of a stator core 2, one coil on one tooth, to manufacture the stator 1 for a rotary electric machine.

Each of the coil 3 in each phase includes a coil body 31 formed by winding a rectangular conductor 301 a plurality of times, one end portion 32 drawn out to one side L1 in the axial direction of the stator core 2 at one end of the coil body 31, and the other end portion 33 drawn out to the one side L1 in the axial direction of the stator core 2 at the other end of the coil body 31. The one end portion 32 of each of the coils 3 in each phase is drawn out in a direction that is orthogonal to an axial direction L of the stator core 2 to extend over the outer side, in the axial direction L of the stator core 2, of the coil body 31 of the coil 3 in a separate phase so as to be aligned with the other end portion 33 of the coil 3 in the same phase.

In the manufacturing method according to the embodiment, in sequentially disposing the coils 3 in a plurality of phases on the teeth 21, one coil on one tooth, toward one side C1 in the circumferential direction of the stator core 2, as illustrated in FIGS. 6 to 10, the one end portion 32 of each of the coils 3 in each phase is inserted from a direction (radial direction and circumferential direction) that is orthogonal to the axial direction L of the stator core 2 to be disposed between the one end portion 32 and the other end portion 33 of the immediately preceding coil 3 in a separate phase disposed on the tooth 21 so as to be aligned with the other end portion 33 of the coil 3 in the same phase. In FIGS. 6 to 10, in order to facilitate understanding, the one end portion 32 is indicated by the solid line in contrast to the cross sections of the stator core 2 and the coils 3.

The method of manufacturing the stator 1 for a rotary electric machine according to the embodiment will be described in detail below with reference to FIGS. 1 to 10.

In the stator 1 according to the embodiment, as illustrated in FIGS. 1 and 2, coils 3U, 3V, and 3W formed in three phases, namely U-phase, V-phase, and W-phase, are repeatedly disposed on the plurality of teeth 21 of the stator core 2 a plurality of times in the same order of disposition. Each of the coils 3 in each phase is joined to each other through the one end portion 32 and the other end portion 33 to form U, V and W phases of link coils. Each of the link coils in each phase is star-connected. The one end portion 32 of each of the link coils in each phase, forms a neutral point 34 at which the one end portion 32 of each of the coils 3 in each phase is joined to each other. The other end portion 33 of each of the link coils in each phase forms a lead portion 35 for external connection.

The rectangular conductor 301 which forms each of the coils 3 in each phase has a generally rectangular cross-sectional shape, and is formed by coating the outer periphery of a conductive layer made of a copper material or the like with a coating layer made of a resin material or the like. The rectangular conductor 301 may have a flat cross-sectional shape having parallel flat surfaces.

Figure 3:
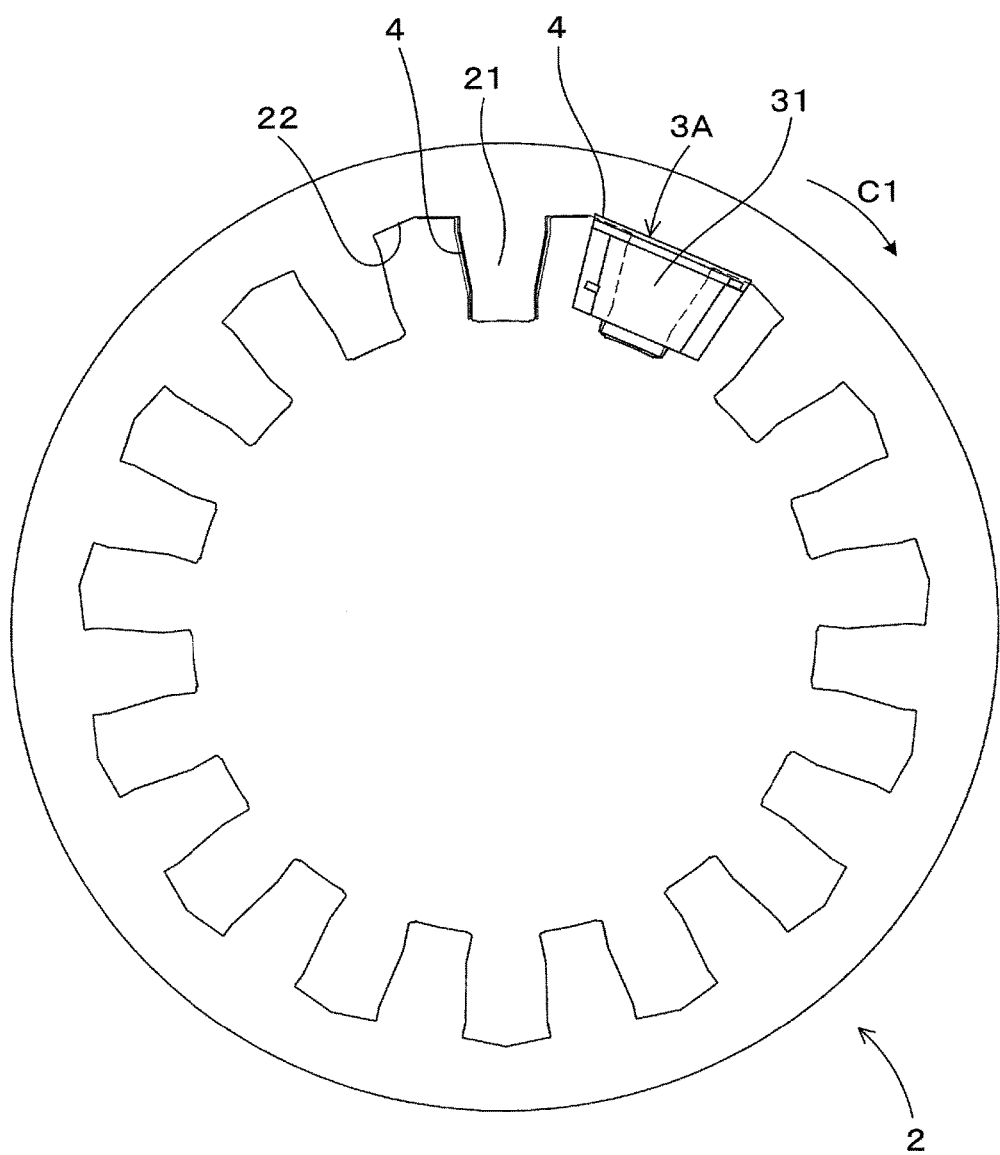
FIG. 3 is a plan view illustrating a state in which coils are disposed on a stator core according to the embodiment.
Figure 4:
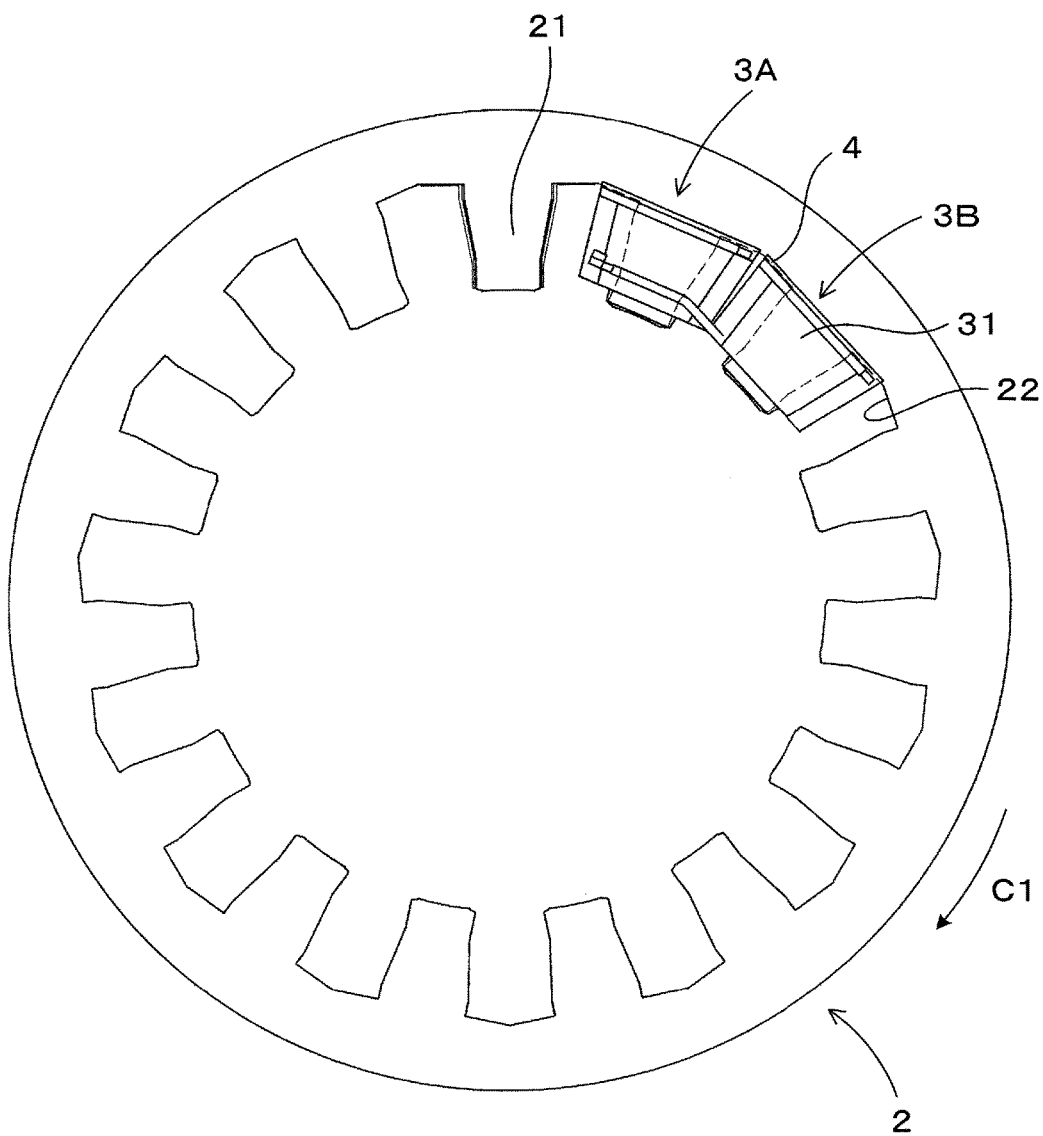
FIG. 4 is a plan view illustrating a state in which coils are disposed on a stator core according to the embodiment.
Figure 5:
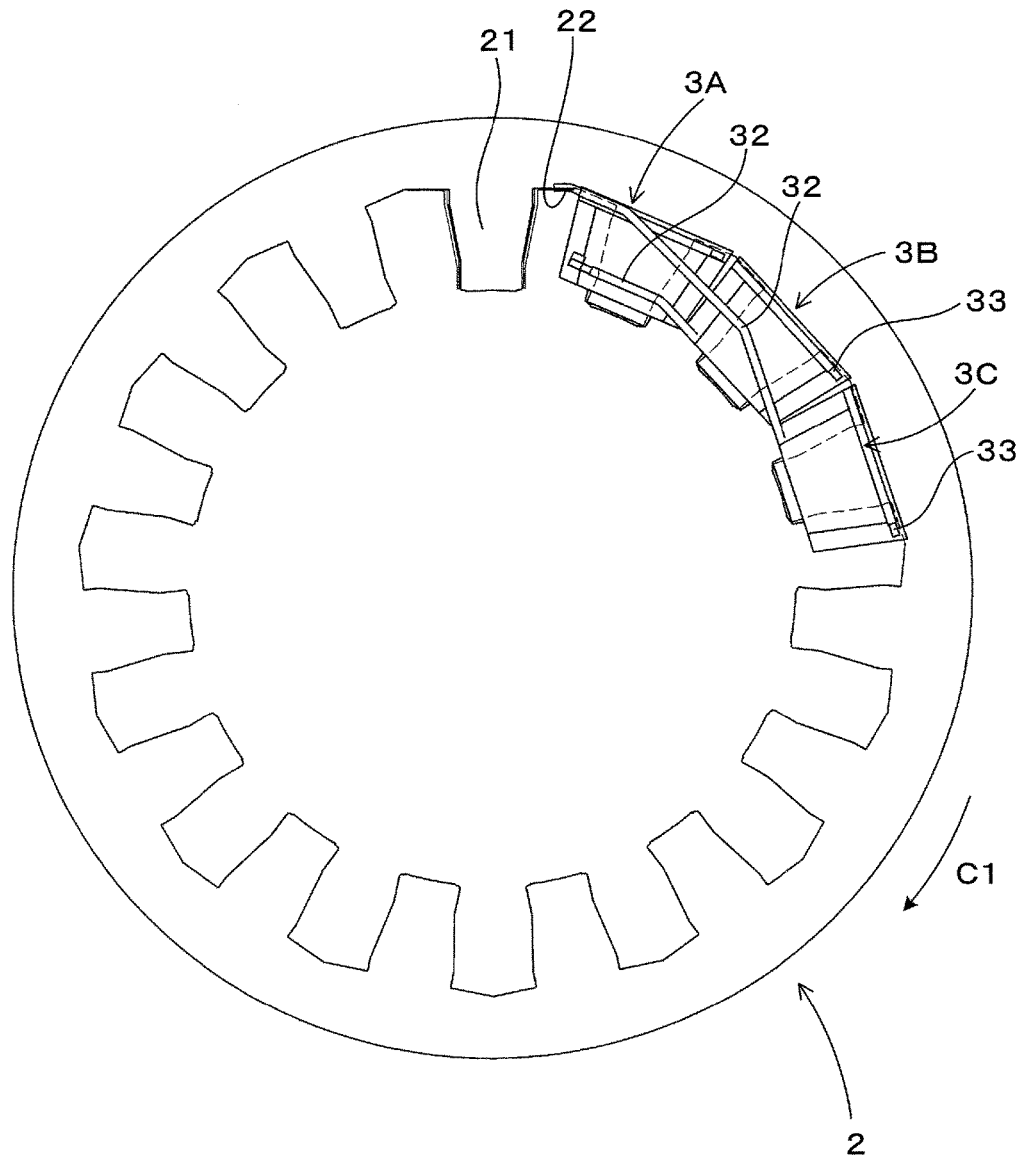
FIG. 5 is a plan view illustrating a state in which coils are disposed on a stator core according to the embodiment.

Each of the coils 3 in each phase according to the embodiment is a coil wound by concentrated winding formed by drawing out the one end portion 32 and the other end portion 33 from the coil body 31 formed by winding the rectangular conductor 301 a plurality of times. As illustrated in FIGS. 3 to 5, each of the coils 3 in each phase is singly mounted to the outer periphery of the tooth 21, one coil on one tooth, so as to be disposed in slots 22 positioned on both sides of the tooth 21 in the circumferential direction.

As illustrated in FIG. 1, the one end portion 32 of each of the coils 3 in each phase is drawn outward with respect to an axial end surface 201 on the one side L1 in the axial direction of the stator core 2 from the radially inner end portion of each of the coils 3 in each phase, and thereafter extends in a direction that is orthogonal to the axial direction L of the stator core 2. The other end portion 33 of each of the coils 3 in each phase is drawn outward in the axial direction L of the stator core 2 on the one side L1 in the axial direction of the stator core 2 from the radially outer end portion of the coil 3.

The one end portion 32 of each of the coils 3 in each phase according to the embodiment is a lead portion that extends from one of a winding start portion and a winding end portion of the coil body 31. Meanwhile, the other end portion 33 of each of the coils 3 in each phase according to the embodiment is a bus bar portion that extends from the other of the winding start portion and the winding end portion of the coil body 31.

Figure 6:
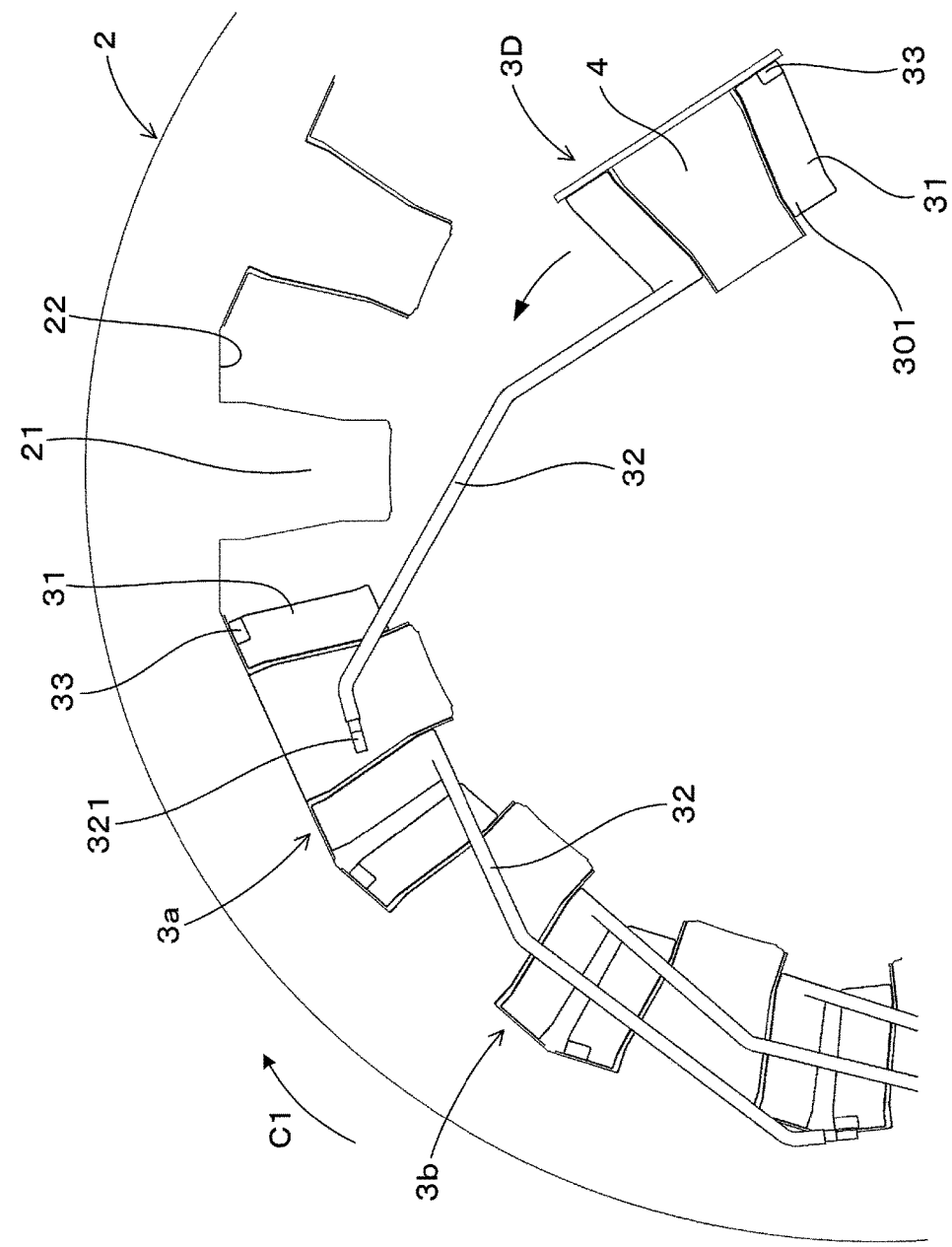
FIG. 6 illustrates a state in which coils are disposed on a stator core according to the embodiment as enlarged.

As illustrated in FIG. 6, the coil body 31 of each of the coils 3 in each phase is formed by winding the rectangular conductor 301 in two layers on the inner and outer peripheries. The coil body 31 may be formed by winding the rectangular conductor 301 in one layer, or may be formed by winding the rectangular conductor 301 in three or more layers on the inner and outer peripheries.

As illustrated in FIG. 3, each tooth 21 of the stator core 2 is formed such that an end portion on the inner peripheral side is the smallest in outer diameters. The coil body 31 of each of the coils 3 in each phase is formed in a rectangular ring shape that becomes larger in dimension toward the outer peripheral side.

Each of the coils 3 in each phase is disposed on the outer periphery of an insulator 4, which is a resin that insulates the coil 3 from the stator core 2. The insulator 4 is mounted to the tooth 21 with the coil body 31 held on the outer periphery.

Next, the method of disposing each of the coils 3 in each phase on the tooth 21 of the stator core 2 and the function and effect of the embodiment will be described.

In the following description, coils 3A, 3B, 3C, 3D, 3E, 3a, 3b, and 3c are the coils 3 in their respective phases given such symbols for convenience.

In the embodiment, first, as illustrated in FIG. 3, the insulator 4 for holding the coil 3E that is the last to be disposed on the stator core 2 is mounted to the tooth 21. Then, the coils 3A, 3B, 3C, and 3D formed in three phases held on the outer periphery of the insulator 4 are sequentially disposed on the teeth 21, one coil on one tooth, toward the one side C1 in the circumferential direction of the stator core 2 (see FIG. 2).

As illustrated in FIG. 3, the coil 3A that is the first to be disposed on the stator core 2 does not interfere with the coil 3 in a separate phase. Therefore, the coil 3A is mounted to the tooth 21 by causing the coil 3A to face the inner peripheral side of the tooth 21 of the stator core 2 and moving the coil 3A toward the outer peripheral side with the coil 3A in parallel with the radial direction. In the embodiment, the coils 3A and 3E that are the first and the last to be disposed on the stator core 2, respectively, form the neutral point 34.

Next, as illustrated in FIG. 4, the coil 3B that is the second to be disposed on the stator core 2 is also mounted to the tooth 21 by moving the coil 3B toward the outer peripheral side with the coil 3B in parallel with the radial direction as with the coil 3A that is the first disposed. In the embodiment, the coil 3B that is the second to be disposed on the stator core 2 forms the neutral point 34.

Next, as illustrated in FIG. 5, the coil 3C that is the third to be disposed on the stator core 2 is disposed on the tooth 21 by causing the one end portion 32 of the coil 3C to pass between the one end portion 32 and the other end portion 33 of the second coil 3B that has already been disposed on the stator core 2.

Then, a state in which the coils 3D (hereinafter referred to "turn disposition coils 3D") that are the fourth and subsequent coils to be disposed, excluding the coil 3 that is the last to be disposed, are disposed on the teeth 21 of the stator core 2 will be described stepwise with reference to FIGS. 6 to 10.

First, as illustrated in FIG. 6, the turn disposition coil 3D is disposed on the inner peripheral side of the stator core 2 such that a distal end portion 321 of the one end portion 32 of the turn disposition coil 3D is disposed between the one end portion 32 and the other end portion 33 of the immediately preceding coil 3a disposed on the tooth 21 of the stator core 2.

Figure 7:
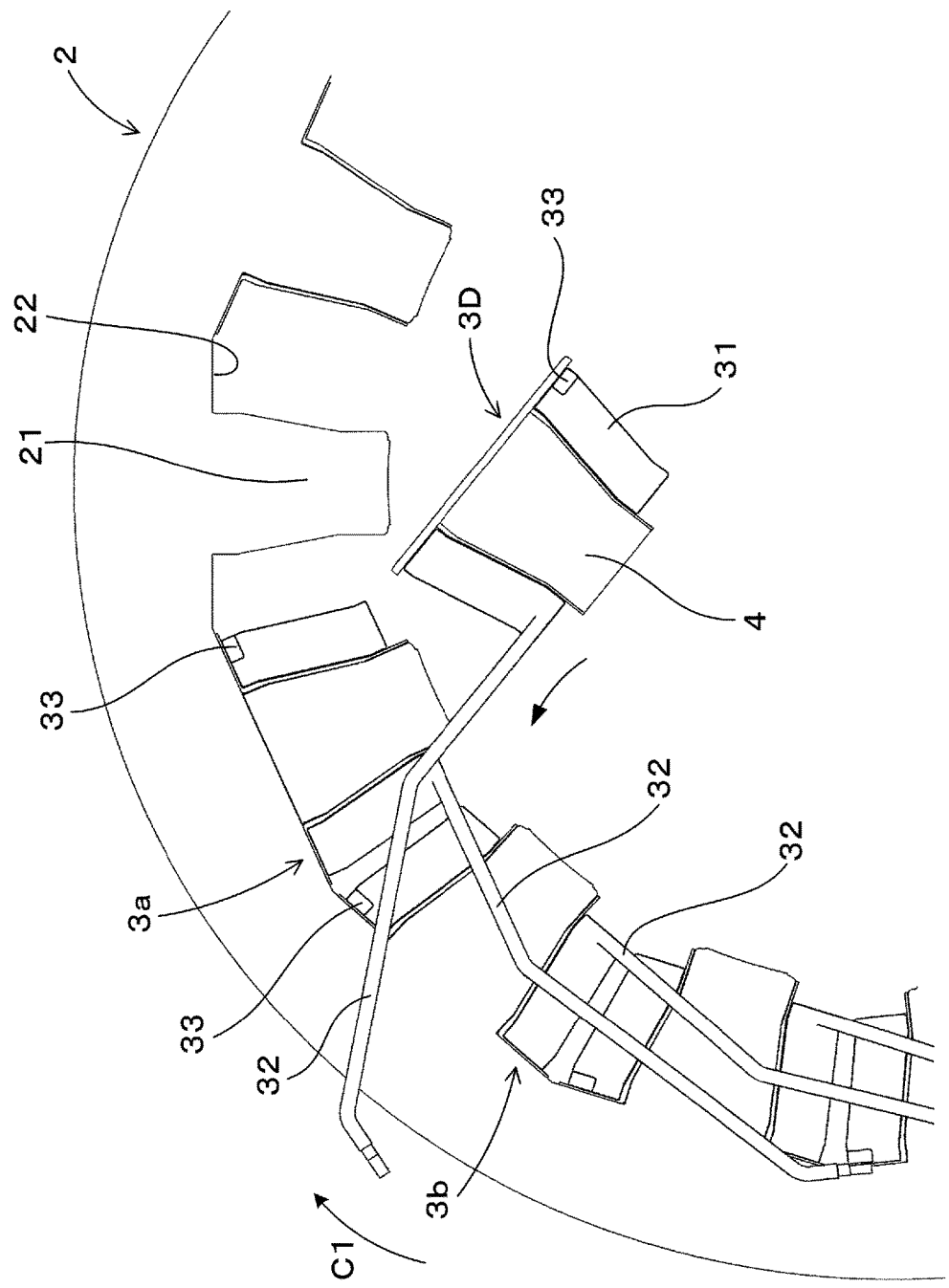
FIG. 7 illustrates a state in which coils are disposed on a stator core according to the embodiment as enlarged.

Next, as illustrated in FIG. 7, the turn disposition coil 3D is moved on the inner peripheral side of the stator core 2 such that the one end portion 32 of the turn disposition coil 3D is disposed between the one end portion 32 and the other end portion 33 of the immediately preceding coil 3a disposed on the tooth 21 of the stator core 2 and between the one end portion 32 and the other end portion 33 of the coil 3b disposed on the tooth 21 of the stator core 2 two steps before.

The turn disposition coils 3D according to the embodiment are sequentially disposed with the distal end portion 321 of the one end portion 32 inserted from a direction (radial direction and circumferential direction) that is orthogonal to the axial direction L of the stator core 2 to be disposed between the one end portion 32 and the other end portion 33 of the immediately preceding coil 3a disposed on the tooth 21 of the stator core 2 and between the one end portion 32 and the other end portion 33 of the coil 3b disposed on the tooth 21 of the stator core 2 two steps before.

In addition, the turn disposition coil 3D according to the embodiment is moved to an axial position that matches the axial position of the tooth 21 so that the one end portion 32 of the turn disposition coil 3D is disposed between the one end portion 32 and the other end portion 33 of the immediately preceding coil 3a disposed on the tooth 21. In other words, the one end portion 32 of the turn disposition coil 3D according to the embodiment is disposed between the one end portion 32 and the other end portion 33 of the immediately preceding coil 3a disposed on the tooth 21 with the one end portion 32 of the turn disposition coil 3D positioned so as to overlap the one end portion 32 of the immediately preceding coil 3a disposed on the tooth 21 as viewed in the radial direction of the stator core 2.

Figure 8:
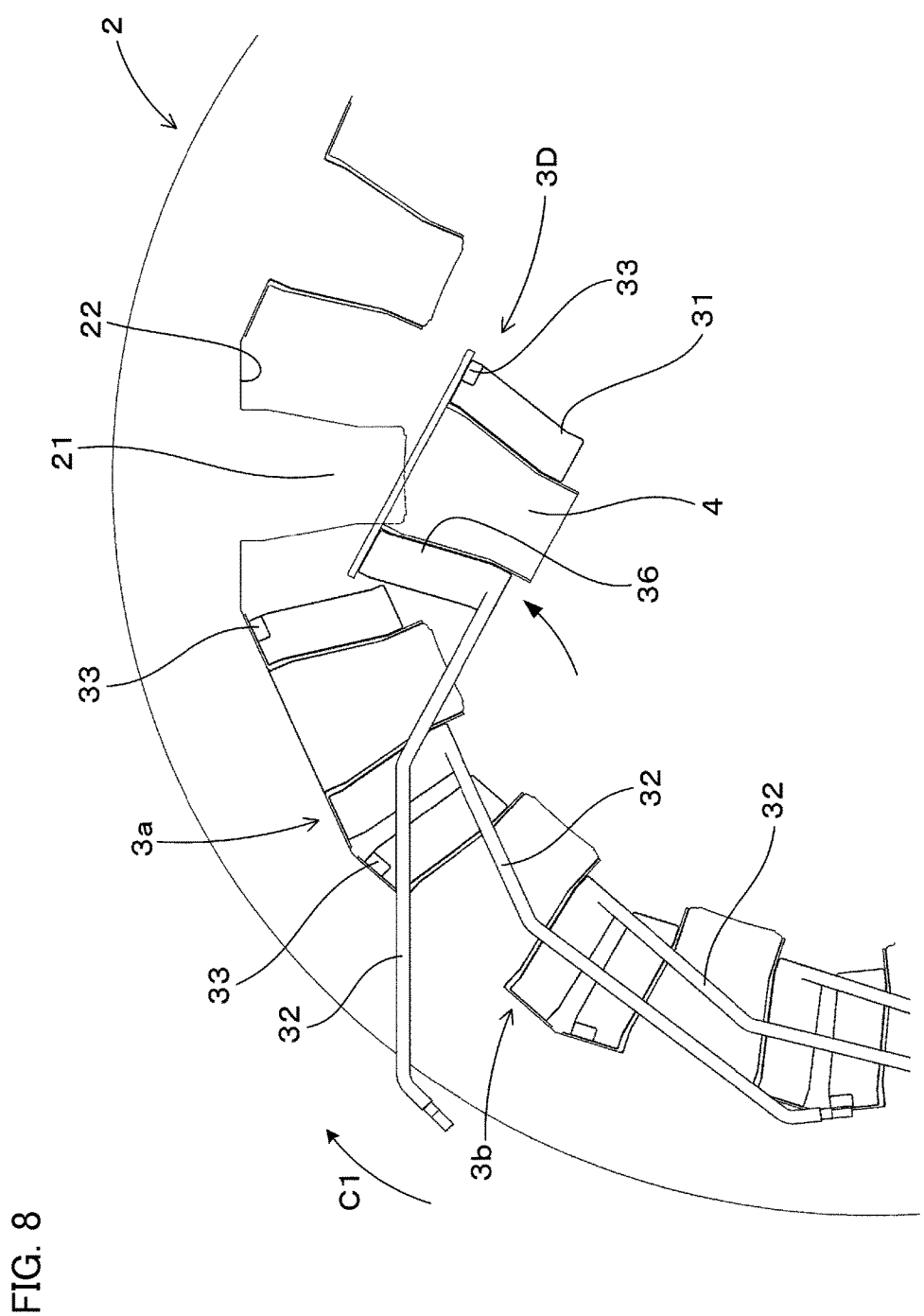
FIG. 8 illustrates a state in which coils are disposed on a stator core according to the embodiment as enlarged.

Next, as illustrated in FIG. 8, the turn disposition coil 3D is moved on the inner peripheral side of the stator core 2 such that the insulator 4 holding the turn disposition coil 3D is disposed at the distal end portion of the tooth 21. In this event, the turn disposition coil 3D is arranged obliquely with respect to the radial direction of the tooth 21, and disposed on the tooth 21 first from a portion 36 of the rectangular conductor 301 of the coil body 31 positioned on the side form which the one end portion 32 is drawn out. In addition, the turn disposition coil 3D is disposed on the tooth 21 such that the one end portion 32 of the turn disposition coil 3D passes over the outer side, in the axial direction L, of the coil bodies 31 of the coils 3 in the other two phases.

Figure 9:
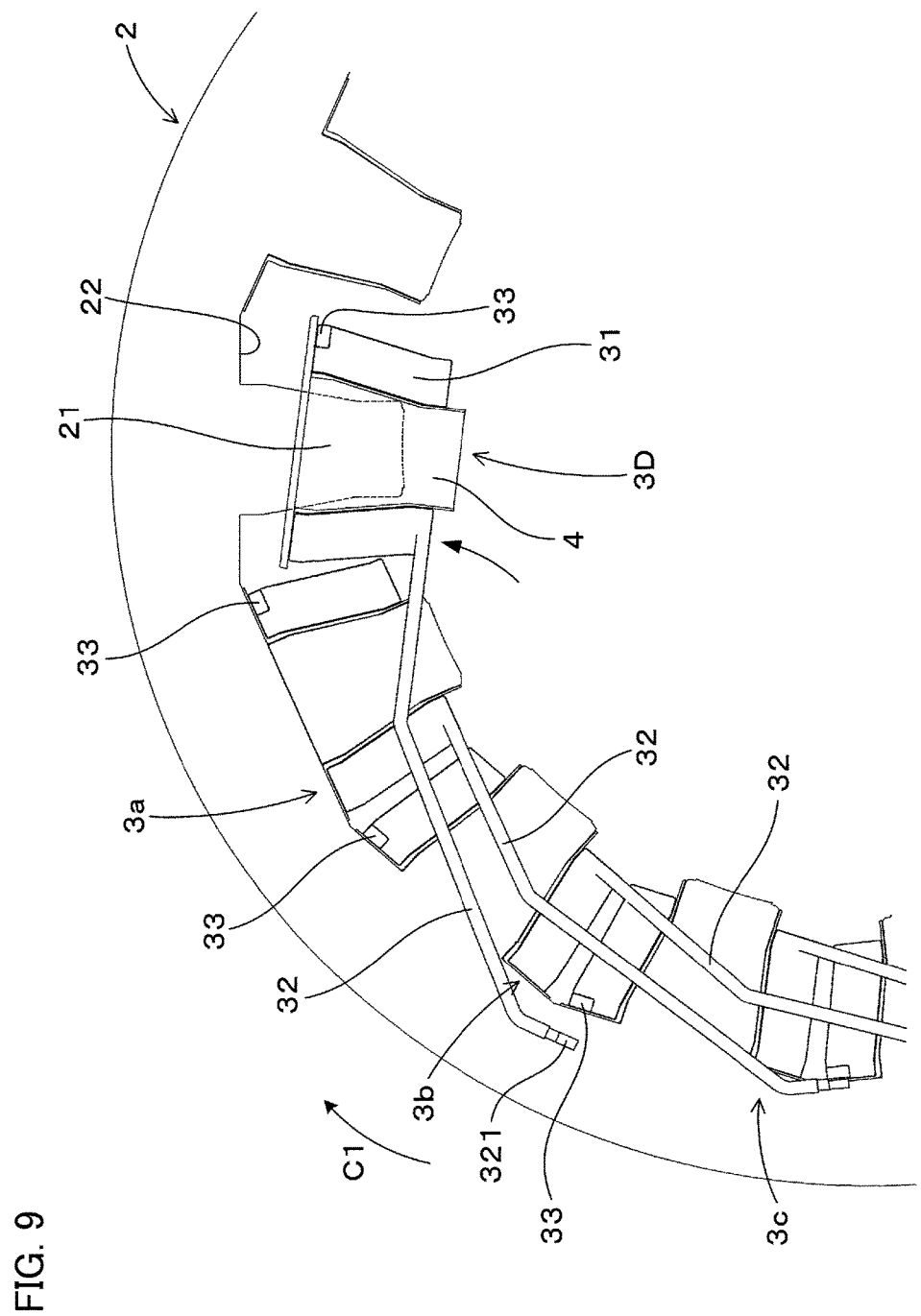
FIG. 9 illustrates a state in which coils are disposed on a stator core according to the embodiment as enlarged.

Next, as illustrated in FIG. 9, the turn disposition coil 3D held by the insulator 4 is turned to be disposed deeper on the tooth 21. In this event, the one end portion 32 of the turn disposition coil 3D is moved closer to the other end portion 33 of the coil 3c disposed on the tooth 21 of the stator core 2 three steps before in the same phase from the radially outer side.

Figure 10:
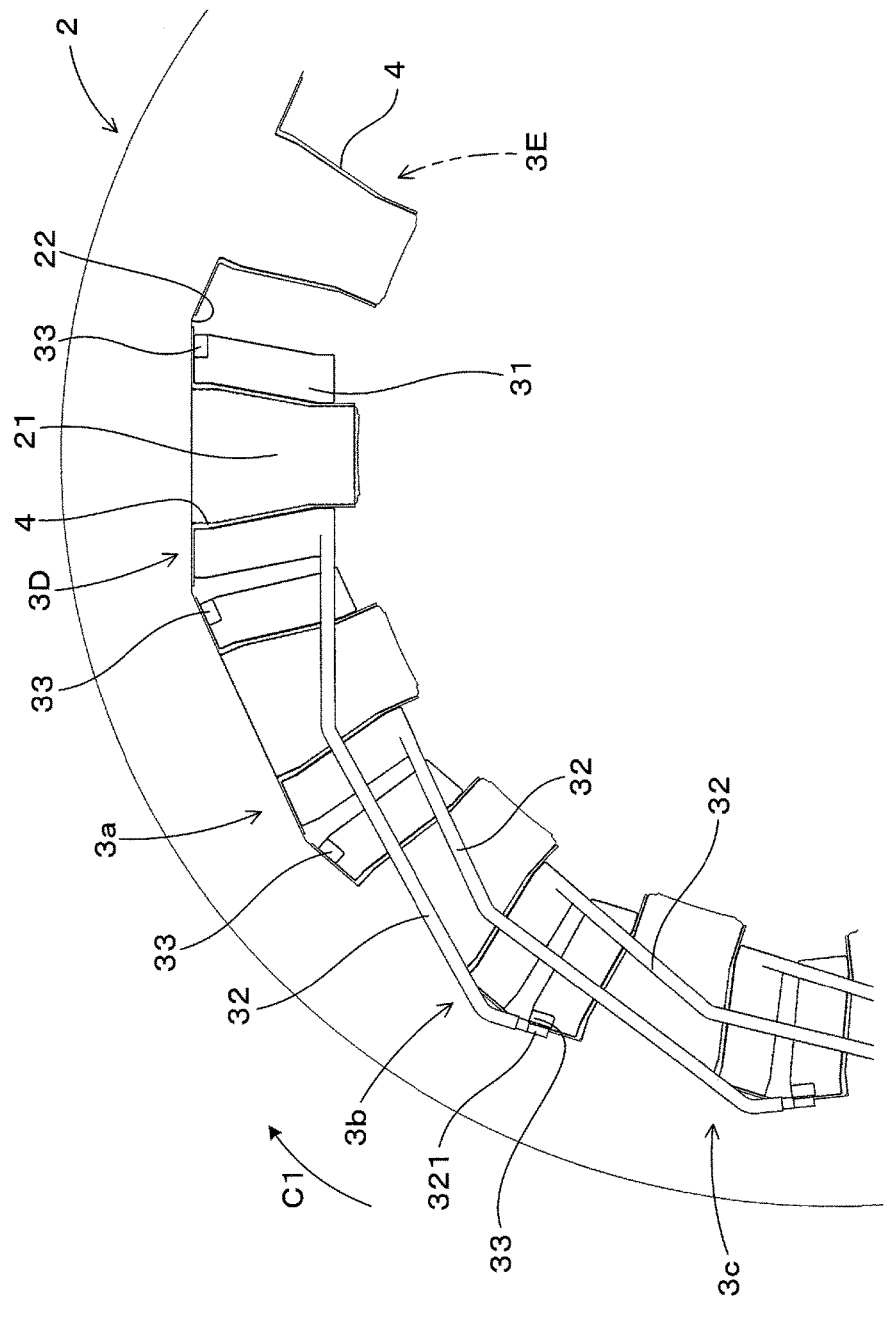
FIG. 10 illustrates a state in which coils are disposed on a stator core according to the embodiment as enlarged.

Then, as illustrated in FIG. 10, the one end portion 32 of the turn disposition coil 3D is aligned with the other end portion 33 of the coil 3c disposed on the tooth 21 of the stator core 2 three steps before in the same phase from the radially outer side.

After the turn disposition coils 3D, of the coils 3 formed in three phases, are disposed on the stator core 2, the coil 3E that is the last to be disposed on the stator core 2 is disposed on the insulator 4 first mounted to the tooth 21 (see FIG. 2). In this way, all the coils 3 formed in three phases are disposed on the stator core 2.

In the stator core 2, in addition, the one end portion 32 and the other end portion 33 of the coils 3 in the same phase aligned with each other, the one end portions 32 which form the neutral point 34, and the other end portions 33 which form the lead portions 35 may be welded to be joined.

Disposing the turn disposition coils 3D on the stator core 2 as described above makes it easy to prevent the one end portion 32 of each of the turn disposition coils 3D from interfering with the coil 3 in a separate phase already disposed on the tooth 21. In addition, disposing the turn disposition coils 3D on the stator core 2 as described above eliminates the need to shift the position at which the one end portion 32 and the other end portion 33 are formed in the axial direction L among the coils 3 formed in three phases. Therefore, it is possible to reduce the amount by which the one end portion 32 and the other end portion 33 of each of the coils 3 in each phase project from the axial end surface 201 of the stator core 2.

In addition, the bent shape of the one end portion 32 of each of the coils 3 in each phase can be formed in advance before each of the coils 3 is disposed on the stator core 2. This eliminates the need to process, e.g. bend, the coil 3 disposed on the stator core 2. Therefore, it is possible to reduce the amount by which the one end portion 32 and the other end portion 33 of each of the coils 3 in each phase project from the axial end surface 201 of the stator core 2 also for this reason.

In addition, the one end portion 32 of each of the coils 3 in each phase may be inserted from the one side L1 in the axial direction of the stator core 2 to be disposed between the one end portion 32 and the other end portion 33 of the immediately preceding coil 3 in a separate phase disposed on the tooth 21. In this case, the distal end portion 321, or any section from the distal end portion 321 to the base end portion, of the one end portion 32 of the turn disposition coil 3D may be inserted from the one side L1 in the axial direction of the stator core 2 to be disposed between the one end portion 32 and the other end portion 33 of the immediately preceding coil 3a disposed on the tooth 21 of the stator core 2 and between the one end portion 32 and the other end portion 33 of the coil 3b disposed on the tooth 21 of the stator core 2 two steps before (see FIGS. 6 and 7).

In this case, in addition, the turn disposition coil 3D is disposed at a position shifted to the one side L1 in the axial direction with respect to the tooth 21 of the stator core 2, and moved closer to the tooth 21 while being kept at the same position. After that, the turn disposition coil 3D can be moved toward the other side in the axial direction of the stator core 2 to an axial position at which the turn disposition coil 3D directly faces the tooth 21 of the stator core 2.

Therefore, with the method of manufacturing the stator 1 for a rotary electric machine according to the present embodiment, it is possible to easily dispose the coil 3 on the stator core 2, and to reduce the length of the entire stator 1 in the axial direction L.

The invention claimed is:

1. A method of manufacturing a stator for a rotary electric machine by disposing coils in a plurality of phases on a plurality of teeth of a single-piece stator core, one coil on one tooth, wherein:

each of the coils in each phase includes a coil body formed by winding a rectangular conductor a plurality of times, one end portion drawn out to one side in an axial direction of the stator core at one end of the coil body, and an other end portion drawn out to the one side in the axial direction of the stator core at an other end of the coil body;

the one end portion of each of the coils in each phase is drawn out in a direction that is orthogonal to the axial direction of the stator core to extend over an outer side, in the axial direction of the stator core, of the coil body of the coil in a separate phase so as to be aligned with an other end portion of a coil in a same phase; and in sequentially disposing the coils in the plurality of phases on the teeth using a tooth from the plurality of teeth already formed in the single-piece stator core, one coil on one tooth, toward one side in the circumferential direction of the stator core, the one end portion of each of the coils in each phase is inserted from a direction that is orthogonal to the axial direction of the stator core, to be disposed between the one end portion and an other end portion of an immediately preceding coil in a separate phase disposed on the tooth so as to be aligned with the other end portion of the coil in the same phase.

2. The method of manufacturing a stator for a rotary electric machine according to claim 1, wherein each of the coils in each phase, which is disposed between the one end portion and the other end portion of the immediately preceding coil in a separate phase disposed on the tooth, is disposed on the tooth first from a portion of the rectangular conductor of the coil body positioned on a side from which the one end portion is drawn out.

3. The method of manufacturing a stator for a rotary electric machine according to claim 2, wherein the one end portion of each of the coils in each phase, which is disposed between the one end portion and the other end portion of the immediately preceding coil in a separate phase disposed on the tooth, is aligned with the other end portion of the coil in the same phase from a radially outer side with respect to the other end portion.

4. The method of manufacturing a stator for a rotary electric machine according to claim 3, wherein the coils in the plurality of phases are coils formed in three phases; and in disposing each of the coils in each phase on the tooth, the one end portion of each of the coils in each phase is aligned with the other end portion of the coil in the same phase by disposing the one end portion between the one end portion and the other end portion of the immediately preceding coil in a separate phase disposed on the tooth and between the one end portion and the other end portion of the coil disposed on the tooth two steps before in a separate phase.

5. The method of manufacturing a stator for a rotary electric machine according to claim 2, wherein the coils in the plurality of phases are coils formed in three phases; and in disposing each of the coils in each phase on the tooth, the one end portion of each of the coils in each phase is aligned with the other end portion of the coil in the same phase by disposing the one end portion between the one end portion and the other end portion of the immediately preceding coil in a separate phase disposed on the tooth and between the one end portion and the other end portion of the coil disposed on the tooth two steps before in a separate phase.

6. The method of manufacturing a stator for a rotary electric machine according to claim 1, wherein the one end portion of each of the coils in each phase, which is disposed between the one end portion and the other end portion of the immediately preceding coil in a separate phase disposed on the tooth, is aligned with the other end portion of the coil in the same phase from a radially outer side with respect to the other end portion.

7. The method of manufacturing a stator for a rotary electric machine according to claim 6, wherein the coils in the plurality of phases are coils formed in three phases; and in disposing each of the coils in each phase on the tooth, the one end portion of each of the coils in each phase is aligned with the other end portion of the coil in the same phase by disposing the one end portion between the one end portion and the other end portion of the immediately preceding coil in a separate phase disposed on the tooth and between the one end portion and the other end portion of the coil disposed on the tooth two steps before in a separate phase.

8. The method of manufacturing a stator for a rotary electric machine according to claim 1, wherein the coils in the plurality of phases are coils formed in three phases; and in disposing each of the coils in each phase on the tooth, the one end portion of each of the coils in each phase is aligned with the other end portion of the coil in the same phase by disposing the one end portion between the one end portion and the other end portion of the immediately preceding coil in a separate phase disposed on the tooth and between the one end portion and the other end portion of the coil disposed on the tooth two steps before in a separate phase.

* * * * *